INVENTOR
Herbert LANG

3,425,401
ELECTRONIC CONTROLLER FOR DIESEL ENGINE

Herbert Lang, Asperg, Germany, assignor to Robert Bosch G.m.b.H., Stuttgart, Germany, a limited-liability company of Germany
Filed Mar. 21, 1967, Ser. No. 624,869
Claims priority, application Germany, May 20, 1966, B 87,208
U.S. Cl. 123—102       14 Claims
Int. Cl. F02d 11/10; H01h 35/06, 35/10

ABSTRACT OF THE DISCLOSURE

A fuel control, typically a pedal for a vehicle type diesel engine provides, by control of a potentiometer, a voltage proportional to pedal setting to control an electromagnetic fuel valve; three similar non-linear circuits, each fed by a speed-dependent voltage, are connected to the potentiometer to change the resistance regardless of pedal setting and thus limit maximum and minimum speed of the engine and further provide override limit of fuel supply at intermediate speeds to prevent excessive fuel, and thus, smoking; the non-linear circuits include breakdown diodes and temperature-compensation circuits, and are connected to the potentiometer by diodes; they include adjustable circuit elements to easily match the performance characteristic of different diesel engines.

---

The present invention relates to an electronic controller or regulator for diesel engines to control the position of a valve element which determines the amount of fuel injected during the working strokes of the engine, and more particularly to such a controller which regulates the upper and lower limits of speed of the engine, and, if desired, further various operating parameters of the engine as determined by the speed-load characteristics of the engine for which the controller is designed, all in conjunction with a fuel controller, the setting of which is manually determined by the operator of the engine.

Mechanical, hydraulic, or pneumatically operating regulators for diesel motors are well known. Contrary to the Otto Engine, that is the ordinary gasoline engine, which, together with a throttle control operates stably, a diesel motor requires a regulator which effecively prevents that a certain maximum designed speed be exceeded, that is it requires a top-speed limiter. Further, diesel engine regulators require that a certain minimum speed be maintained, that is they provide an idling speed control. Further, a regulator is necessary in order to control the fuel which is supplied upon starting. Ordinarily, upon starting, an excess amount of fuel is required. Yet, with certain speeds the amount of fuel injected will not be burned completely and thus, smoke and fumes will be emitted from the exhaust system. The regulator must thus provide for a minimum speed, a maximum speed, and further for a regulation of the amount of fuel to prevent smoking or the emission of fumes.

Generally, regulators can be divided into two groups: the idle-maximum speed regulators and the continuously variable regulators. The continuously variable regulators control the speed depending upon a particular position of the fuel-control pedal within the speed-load diagram of the engine. Such regulators are particularly necessary for municipal and public service vehicles, for example street-cleaning machines and the like, and with tractors. The maximum-idle-speed regulators become effective only upon extreme operating conditions of the engine—idling or maximum speed. They prevent stalling and run-away of the engine. Intermediate positions of speed, between stalling and maximum, are controlled entirely by operation of the fuel control by the operator.

The functions of both regulators—limit regulation and intermediate regulation to match a fuel control to operate in accordance with the characteristics of the engine are likewise known. It has been found in practice, that it is difficult to construct a regulator which can readily be matched to various types of diesel engines. It thus is necessary to design regulators separately for each type and power rating of diesel engine. The reason is, that each type of diesel engine has a special characteristic speed-load diagram which can be utilized effectively only when the regulator is matched as accurately as possible to the particular diagram of the particular engine. In order to adjust known regulators, measuring and adjustment apparatus are necessary, which are complicated, so that adjustment and matching can be done only at the factory or upon first production. It had been intended to design regulators which can be universally useful, so that the substantial economies in mass production can be utilized and economies effected due to the smaller number of replacement parts necessary. Unfortunately, the mechanical solutions did not prove effective. Further, it proved very difficult to provide for adjustments of any regulator to match the particular regulator to the particular engine, even within a series or type of engine being made.

It is an object of the present invention to provide a regulator which is easily adjustable, which can readily be matched to engines of different types, and to a particular engine within a particular type, and which can further be readily adjusted to consider extraneous operating parameters, such as ambient atmospheric pressure.

Subject matter of the invention

Briefly, the controller for the diesel engine controls the setting of the injection pump. It is adapted to operate together with a manually-settable controller, such as a pedal to be controlled by the operator of the engine. A tachometer or similar device is provided coupled to the engine directly, or to some other component having a speed proportional to engine speed, and providing an output signal which is directly proportional to engine speed. The controller will then control the maximum and minimum speed as well as engine operating parameters within the speed-load diagram.

According to the present invention, the fuel controller or pedal is connected to a means generating a variable control potential, such as a potentiometer connected across a battery. This control potential is applied to the means controlling the amount of fuel to be injected. This control potential can be modified, however, and to this end a pair of oppositely poled diodes are connected thereto, each in turn connecting a non-linear circuit supplied by the potential derived from the speed-dependent source, that is the tachometer. When idling, the circuits are so arranged that one increases the control potential and the other one decreases it. By making the non-linear circuits such that their internal resistance is less than that of the variable control potential source, they will not influence each other, and yet effectively increase of decrease, as the case may be, the potential obtained from the variable control potential source. A third non-linear circuit, having different transfer characteristics than any one of the pair, can likewise be connected to modify the output from the variable control potential source, prevent excessive fuel supply, under certain operation, and thus prevent smoking.

The various non-linear circuits can be designed to be substantially similar so that manufacturing economies can be provided; the use of adjustable electrical components such as variable resistances and potentiometers permits ready matching of the operating characteristics of the controller to the operating characteristics of a particular diesel engine, as governed by its load-speed diagram.

The structure, organization and operation of the invention will now be described more specifically in the following detailed description with reference to the accompanying drawings, wherein.

Figure 1:
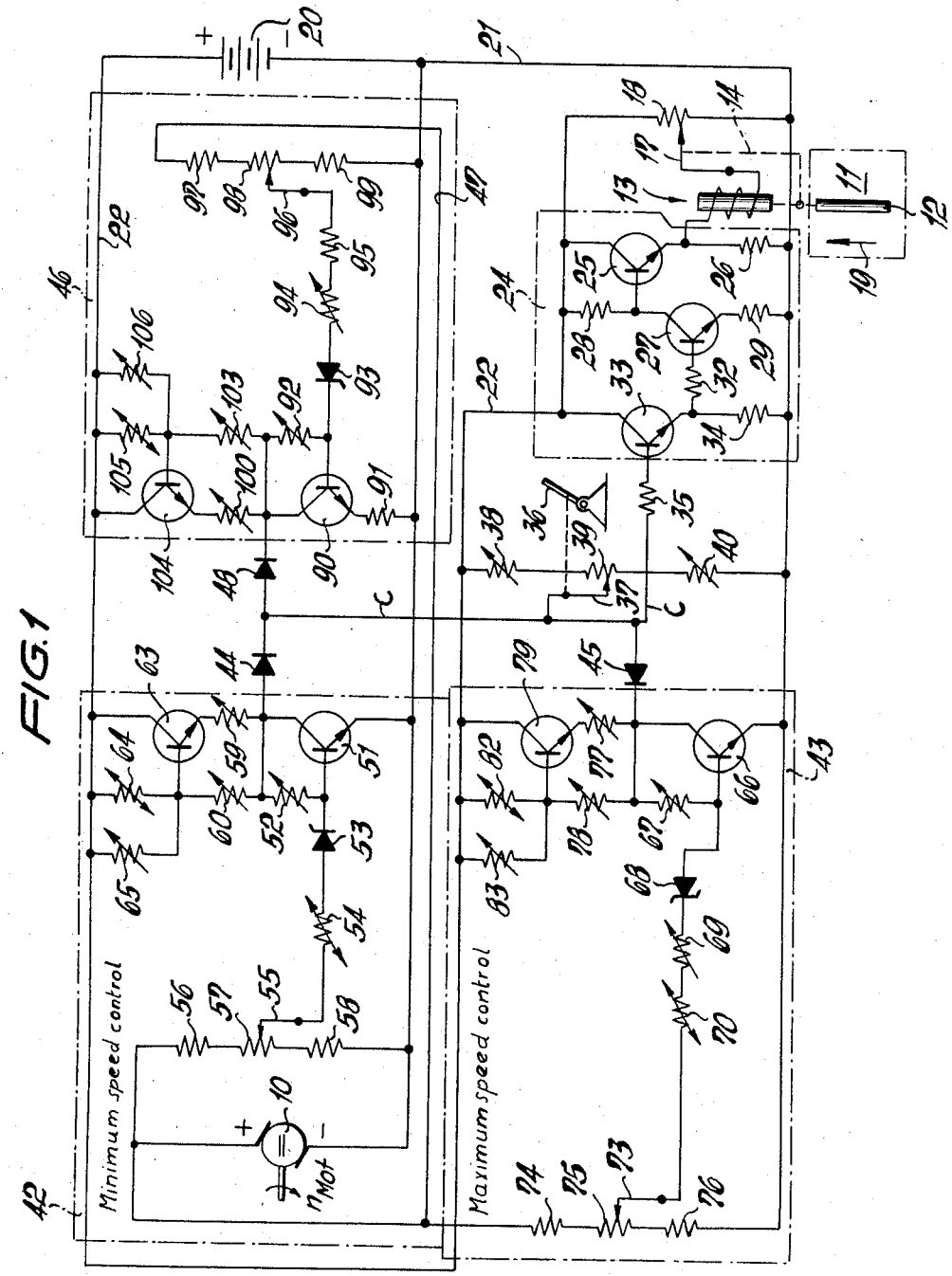
FIGURE 1 illustrates a circuit diagram of an electronic regulator in accordance with the present invention, providing for maximum and minimum speed limiting as well as for full load compensation.

Referring now to FIGURE 1: the controller or regulator of FIGURE 1 is to operate with a diesel engine, not shown. Coupled to the engine is a tachometer-generator 10, driven by the engine with a speed $n_{Mot}$. Fuel is supplied to the diesel engine by means of an injection pump illustrated schematically only at 11, and which may be of any well known construction. The injection pump contains a regulating member 12, such as a regulating valve, the position of which is determined by an electromagnet 13. Parts 12 and 13, together, form the fuel control. A mechanical linkage 14, shown in dashed lines in FIGURE 1, interconnects the fuel control 12–13 with the the tap point 17 of a potentiometer 18, forming a mechanical-electrical position transducer. When element 12 moves upwardly, that is in the direction of the arrow 19 (FIGURE 1), the amount of fuel increases. This changes the position of tap 17 on potentiometer 18, thus causing an increase in potential between tap 17 and negative terminal 21 of the battery 20. The positive bus of battery 20 is shown at 22.

Potentiometer 18 is connected across negative and positive buses 21, 22. Tap 17 connects over the electromagnetic control coil of control element 13 to the output of an amplifier, indicated schematically between the dash-dotted lines 24, and specifically to the emitter of an n-p-n transistor 25. The emitter of transistor 25 is further connected over resistance 26 to the negative bus 21.

The collector of transistor 25 is connected directly to the positive bus 22, and its base is connected to the collector of another n-p-n transistor 27, as well as over a collector resistance 28 with positive bus 22. Resistance 29 connects between the emitter of transistor 27 and negative bus 21. The base of transistor 27 connects over a coupling resistance 32 to the emitter of an n-p-n input transistor 33. Resistance 34 is connected between the emitter and the negative bus 21 of transistor 33. The collector of transistor 33 connects directly to the positive line 22. Its base is connected over resistance 35 to the tap point 37 of a voltage-divider formed of three high-resistance resistors 38, 39, 40. Tap point 37 connects to the fuel control pedal 36 of the diesel engine. The voltage divider formed of resistors 38, 39, 40 connects directly across positive and negative buses 22, 21, and thus is connected across a source of constant potential, namely battery 20.

So long as the speed of the engine $n_{Mot}$ and the stroke H of the injection pump 11 is within the speed-load diagram of the engine (FIGURE 3), the quantity of fuel is determined only by the setting of pedal 36, controlling the position of tap 37. Depending upon the setting of pedal 36, the stroke will thus be determined by a line parallel to the abscissa of the diagram of FIGURE 3, three of such parallel lines being shown, for example, at 41, FIGURE 3. The potential at tap 37 is amplified by the amplifier 24 and, if the position of pedal 36 is changed, so as to increase the fuel, will cause an increase of the attractive force of magnet 13, and thus a change in the position of the regulating element 12 in the direction of arrow 19, thus an increase in fuel being injected. Simultaneonsly, the tap 17 on potentiometer 18 is pushed upwardly by linkage 14, so that the potential between tap 17 and negative bus 21 increases, causing a decrease in potential between the emitter of transistor 25 and tap 17; thus, the position of regulating element 12 will come to rest at always the same point determined by the input voltage applied to amplifier 24 and that is, under normal operating conditions, to the position of fuel supply control 36.

Figure 3:
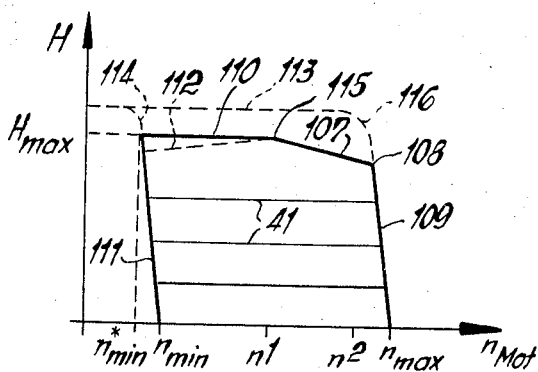
FIGURE 3 is a valve stroke (H-ordinate)-speed (n-abscissa) diagram to illustrate the operation of the controller of FIGURE 1.

The operation of the diesel engine will be determined by the position of the controller 12 of the injection pump 11, and by its load, and will thus follow along one of the lines 41 of the diagram in FIGURE 3. For example, upon substantial loading of the engine, the motor will run slowly; when the load is removed, it will speed up. If, at low loading, the stroke H commanded by the operator due to the setting of pedal 36 is substantial, the danger may arise that the speed of the engine $n_{Mot}$ will exceed the maximum permissible speed $n_{max}$, which will lead to destruction of the engine. Conversely, if the engine is heavily loaded and the stroke H is comparatively small, the speed of the engine will fall below a certain minimum value $n_{min}$ and the engine will stall. The engine may also stall when it is run with a very small stroke of the injection pump and is idling. The regulator in accordance with the present invention prevents both excessive speed as well as stalling.

In order to prevent unusual and dangerous or undesirable operating conditions, a pair of non-linear circuits, 42, 43, are provided, having their inputs connected with tachometer generator 10. The output potential of the non-linear circuits 42, 43 will thus at all times be a function of the speed of the engine. One of these elements, element 42, prevents dropping of the speed below a minimum value; the other, element 43, prevents excessive speed.

Non-linear element 42 is connected over a first diode 44; non-linear element 43 over a second diode 45 poled oppositely to diode 44. Both diodes are connected to a main control bus C, which is further connected to tap point 37, and thus to the input to amplifier 24 and through it to the control of the electromagnet 13 and thus the regulator 12 of the injection pump. Minimum speed non-linear circuit 42 functions by increasing the potential of control bus C when the speed of the engine, $n_{Mot}$ drops below a certain value. The internal resistance of non-linear element 42 is lower than that of the potential source formed by the voltage dividers 38, 39, 40, and thus the potential applied to amplifier 24 is raised. Conversely, non-linear circuit 43 limits the upper speed of the engine, $n_{Mot}$, in such a manner that above a certain speed, the output potential of circuit 43 becomes very small and, because of its own inherent lower internal resistance, limits the potential on bus C.

It will be apparent the invention thus, in a major aspect, relates to generating a manually controllable, variable potential from a source having an inherent high resistance, as well as a low-resistance source of potential, further controlling the operation of the engine, and overriding the high-resistance potential source in dependence on the speed of the engine. By use of a pair of oppositely poled diodes, 44, 45, a very simple construction of controller, providing both upper and lower speed-control limitation is obtained.

In addition to the pair of minimum and maximum speed-control non-linear elements, a further third non-linear circuit 46 is provided. The input to circuit 46 is likewise determined by the speed of the engine, over a line 47 connected to the tachometer generator 10. The output of circuit 46 will thus again be a function depending on the speed of the engine. It is connected over a diode 48 to control bus C and thus to the input to amplifier 24. The non-linear circuit 46 is provided to match the operation of the regulator to the performance characteristics of the engine and to obtain maximum performance without smoking or emission of fumes.

The three non-linear circuits 42, 43, 46 are substantially similar in principle, and they may, indeed, be essentially alike. Each one of them is provided with a temperature-compensation circuit, which is particularly necessary when the construction according to FIGURE 1 is to be used with a vehicle. Stationary installations, less subject to great ambient temperature changes, may operate with a less complicated temperature-compensation arrangement.

Considering now the circuits in detail: diode 44 is connected with its cathode to control bus C and thus to tap 37. Its anode connects to a collector of n-p-n transistor 51, the emitter of which is connected directly to negative bus 21. The base of transistor 51 connects over an adjustable resistor 52 with its collector, as well as directly with the cathode of a break-down diode 53, the anode of which is connected over a NTC-resistance 54 to the tap 55 of a voltage-divider formed of a pair of stable resistances 56, 57 and an additional NTC-resistance 58. The voltage-divider 56, 57, 58 connects across tachometer generator 10.

Figure 2:
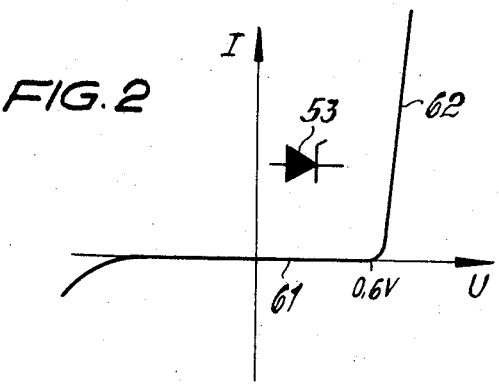
FIGURE 2 is a current (ordinate)-voltage (abscissa) diagram of a break-down diode as used in the present invention.

The current-voltage characteristics of the break-down diode 53 are shown in FIGURE 2. One commercial number of such a diode is SIL 1. As clearly appears from the diagram, to a potential of 0.6 volt, that is in its blocking region, hardly any current will be passed. Upon application of a potential larger than 0.6 v., the current increases abruptly. The conductive region is shown in FIGURE 2 at 62. The transition region from blocking region 61 to break-down region 62 is formed by a slightly rounded knee, which can be considered to still be part of the blocking region. This knee may have disturbing influences to the regulator which prevent use of the engine to its limit of performance, that is maximum torque at maximum speed. The present invention provides for means to avoid the influence of the knee.

Break-down diodes like diode 53 operate in a similar fashion to Zener diodes. Of course, if a Zener diode is used, it would have to be connected in polarity reverse to that shown with respect to diode 53.

The collector of transistor 51 is connected to the emitter of an n-p-n transistor 63, forming a compensation transistor, over a series resistance 59, which is preferably adjustable. It is further connected by means of an adjustable resistance 60 to the base of transistor 63. The collector of transistor 63 connects directly to positive bus 22. The base of transistor 63 connects over a NTC-resistance 64 and an adjustable resistance in parallel therewith, 65, also with the positive bus 22.

The anode of diode 45 is connected with control bus C; its cathode connects to the collector of on n-p-n transistor 66, the emitter of which connects directly to negative bus 21. The base of transistor 66 is connected over an adjustable resistance 67 with its collecter, as well as directly to the anode of a Zener diode 68, the cathode of which connects over an adjustable resistance 69 to a NTC-resistance 70, which in turn connects to a tap point 73 of a voltage-divider formed of three resistances 74, 75, and 76, connected across the tachometer generator 10.

A collector of transistors 66 is connected over an adjustable series resistance 77 with the emitter of a compensation transistor 79, which is of the n-p-n type, and over an adjustable resistance 78 with the base thereof. The collector of transistor 79 is connected directly to positive bus 22. Its base is connected over a NTC-resistance 82 to the positive bus 22, and has in parallel thereto an adjustable resistance 83.

The anode of diode 48 is again connected to the control bus C, so that it is effectively connected in the same polarity as the anode 45 connecting to the maximum speed non-linear circuit 42. The cathode of diode 48 is connected to the collector of n-p-n transistor 90, the emitter of which is connected over a resistance 91 to negative bus 21. The base of transistor 90 is connected over an adjustable resistance 92 with its collector, as well as with the cathode of a break-down diode 93, similar to break-down diode 53 of non-linear circuit 42. The anode of break-down diode 93 is connected over an adjustable resistance 94 and a fixed resistance 95 to the tap 96 of the voltage-divider formed of three resistances 97, 98 and 99. The voltage-divider is again connected over lines 47 and 21 across the tachometer generator 10.

The collector of transistor 90 is connected over an adjustable series resistance 100 with the emitter of an n-p-n transistor 104, functioning as a temperature-compensation transistor, and over an adjustable resistance 103 with the base of the transistor 104. The collector of transistor 104 is connected directly to the positive bus 22, and the base thereof is connected over a NTC-resistance 105, and an adjustable resistance 106, in parallel with NTC-resistance 105 also to positive line 22.

*Operation of the circuit according to the invention*

Let it be assumed that battery 20 is charged and supplies a potential of 12 volts. Resistance 52 in the "minimum" non-linear circuit 42 is so adjusted that transistor 51 is blocked if diode 53 is also blocked, that is, is in the operating region of the curve 61 (FIGURE 2). Thus, a potential of 12 volts will exist between collector and emitter of transistor 51. Similarly, transistor 66 of the "maximum" non-linear circuit is so adjusted by adjustment of resistance 67 that full battery voltage of 12 volts is across the emitter-collector thereof. FIGURE 3 illustrates the potential of 12 volts or rather the stroke H of injection pump 11 and the dashed line 113.

The third non-linear circuit 46 is adjusted by means of setting of resistance 92 in such a manner that when the break-down diode 93 is blocked (region 61, FIGURE 2), a small base current will flow over resistance 92. Thus, the potential between collector and negative line 21 will be less than 12 volts, and the resistance 92 is so set so that it is, for example, 9 volts. Since the collector of transistor 90 thus has a smaller potential with respect to the negative line 21, then the collector of transistor 51 (which is still at 12 volts) will permit current to flow from transistor 51 over diode 44 and diode 48 to the collector of transistor 90, so that the potential of collector of transistor 90 will determine, at low speeds $n_{Mot}$ the potential at control bus C independently of the position of the tap 37. This is so because the internal resistance of the transistor circuits 42, 43, 46 will be chosen to be low with respect to the combined resistances 38, 39, 40. Regulator 11, will, thus, when the engine turns at low speed, be brought up to a large quantity of fuel injected, that is to the curve corresponding to line 110, FIGURE 3. As will be apparent from FIGURE 3, the bend 114 of the idle speed regulating line, shown at 111 in FIGURE 3, will not be effective, since, due to the presence of the third non-linear circuit 46, this bend shown at 114 will be cut off. This bend 114 is, of course, formed by the knee in the characteristic curve of the break-down diode 53, 93. If the operator increases the fuel supply, such as by pressing down on fuel pedal 36, so that the motor speed increases beyond the value $n_1$, the engine will receive too much fuel if the maximum stroke of the injection pump 11 would remain, causing the exhaust to smoke, since the fuel cannot be burned completely. To avoid this, tap 96 of the voltage-divider 97, 98, 99 is so arranged that when a given speed $n_1$ is reached, which corresponds to a certain voltage from tachometer generator 10, breakdown diode 93 will become conductive. This increases the base current in transistor 90, which will become more conductive. Compensation transistor 104, over its resistances 103, 105, 106, will have a positive base potential with respect to its emitter so that, together with the series resistance 100 it will act as a collector resistance for transistor 90. As transistor 90 becomes more and more conductive, the potential between the collector and negative line 21 decreases, and will fall below that value corresponding to the potential requiring maximum speed set by tap 37. Thus, diode 37 will conduct current from tap 37 to the collector of transistor 90, and this will lower the potential at control bus C, that is between tap 37 and negative bus 21. Amplifier 24, and thus regulator 12, will be set to a lower fuel injection position. This fuel injection position will be decreased more and more as the speed of the engine increases since the speed of the engine, and with it the potential at the tachometer generator 10 and potential at tap 96 will increase, thus further increasing the base current of transistor 90 and thus further decreasing the potential between its collector and the negative bus 21 proportionally. The negative feed-back resistance 91 provides for gradual and slow limitation of the stroke of injection pump 21, that is for a gradually drooping characteristic as seen in the region 107 of the curve of FIGURE 3, and which corresponds to the maximum torque curve of the engine. The particular slope of the region 107 can be adjusted by means of change of resistance value of resistor 94 (FIGURE 1, circuit 46); the point of speed at which it starts, that is point 115, can be adjusted by setting of the tap point 96.

If the speed of the engine, $n_{Mot}$, reaches the value $n_2$ (FIGURE 3), then the potential at tap 73 of voltage-divider 74, 75, 76—"maximum" non-linear circuit 43—reaches a value which causes Zener diode 68 to become conductive, so that transistor 66 will carry base current. It is preferred to utilize a Zener diode in the non-linear circuit 43, since the portion of curve 109, that is maximum speed limitation, can be held to be very steep and only small deviations will result. A Zener potential, of approximately 4 volts is large with respect to the breakdown potential of breakdown diodes 53, 93. Thus, resistance 76 can be made large with respect to resistance 74 and the relative values of the voltage-divider 74, 75, 76 will become less critical.

Zener diode 68 also has a knee, as illustrated by region 116 in FIGURE 3. The effect of this knee is cut off in the circuit 43 as well as in circuits 42 and 46. This knee 116 is kept to be above the characteristic line 107 for full load adjustment, and thus the rounding of the knee will have no effect on the fuel injection pump 11. Thus, a sharp transition from characteristic line 107 over break 108 to maximum speed line 109 is obtained. A particular advantage of the arrangement according to FIGURE 1 is that point 108, the point of maximum power output of the diesel engine, can be fully utilized because it is sharp and not subject to gradual dropping-off due to rounding, as would appear from curve 116.

When Zener diode 68 becomes conductive, the base current in transistor 66 increases and it becomes conductive, so that the potential between its collector and its emitter, which previous to conduction, was equal to that of battery 20, will drop to a value which is less than that between tap 37 (control line C) and negative bus 21. Series resistance 67 and transistor 79 will act exactly as series resistance 100 in transistor 104, as previously explained in connection with operation of the non-linear circuit 46. Thus, current will flow from tap 37 over diode 45 to the collector of transistor 66, so that the value of the potential at control bus C, and at tap 37, will decrease. This decrease will be enhanced as the speed of the engine increases, that is as the voltage generated by tachometer generator 10 increases. At the maximum speed, indicated in FIGURE 3 $n_{max}$, transistor 66 will be fully conductive so that the potential between its emitter and its collector is practically 0, so that the regulating element 12 will be brought into a position which corresponds to a minimum fuel supply, for example by means of a spring (not shown). Resistance 69 enables regulation of the slope of the portion of curve 109. NTC-resistance 70, similar to hot-wire conductors 54, 58, provides for temperature compensation. The maximum speed-line 109 is permitted only small variations in actual operation—for example 12%—and the compensation circuit formed of transistors 79 and resistances 67, 78, 82, 83 may not suffice to completely compensate for all temperature variations. The NTC-resistance 70 provides for full compensation.

At speeds below $n_1$, the maximum fuel amount $H_{max}$ can be utilized by suitable adjustment of the pedal 36. This is indicated at the region 110 of the diagram of FIGURE 3.

When the engine is idling, control pedal 36 is in its rest position and a certain minimum amount of fuel is supplied by pump 11. If, for some external reason, the speed of the engine falls below a certain value $n_{min}$, break-down diode 53, which up to that point has been conductive, will block. Transistor 51, having been conductive up to this point, will receive little or no base current so that the potential between its emitter and its collector will rise. As this potential rises, the potential on control bus C with respect to negative line 21 will increase regardless of the setting of the tap 37, and current will flow from the collector of transistor 51 over diode 44. This increases the stroke of the injection pump 11 and prevents drop of the speed below a certain value $n^*_{min}$, which is a speed just below normal idling speed. This regulation, termed minimum speed regulation, is illustrated in region 111 of the diagram of FIGURE 3.

The three compensation transistors 63, 79, 104 connected similarly to each other form, together with their resistances, and the transistors to which they are connected, namely 51, 66 and 90, a virtual collector resistance having a temperature characteristic reciprocal to that of the remainder of the non-linear circuit. The temperature compensation will be described in connection with transistor 63; the function of the circuits in connection with transistor 79 and 104 is similar.

Figure 4:
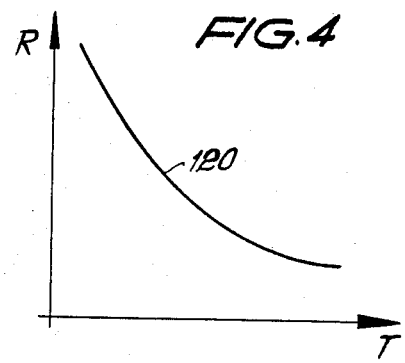
FIGURES 4, 5 and 6 are resistance-temperature diagrams illustrating the operating characteristics of the temperature compensation in accordance with the present invention.
Figure 5:
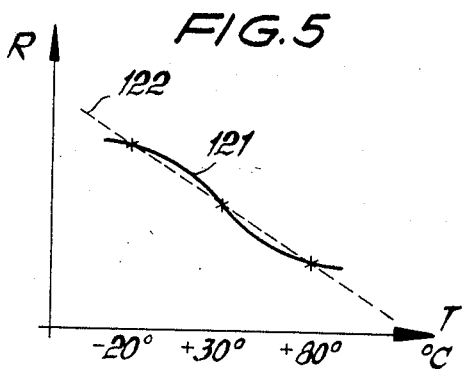

It is well known that the collector current of a transistor increase somewhat linearly with temperature, if the base current is maintained steady. Thus, it is necessary that its collector resistance decreases in order to provide output potential which is independent of temperature. The ordinary temperature-dependent resistances, such as the commonly used negative temperature coefficient resistances (NTC) do not provide for sufficient compensation. The characteristic curve of an NTC resistance is shown in FIGURE 4, curve 120. Since such a characteristic curve is not suitable for temperature compensation, it has to be made linear. This can be achieved by placing a resistance in parallel thereto, the resistance value of which is essentially independent of temperature and which may therefore be referred to as a temperature-stable resistance. The size of this parallel resistance then determines a generally linear region, as illustrated in FIGURE 5, curve 121, which is quite a good approximation of an average line 122. Referring again to FIGURE 1, normally the circuit 42 has a temperature-dependent resistor 64 and a parallel resistance 65 thereto. In series therewith is a resistance 60, which determines the working point of transistor 63. This working point of transistor 63 is chosen, preferably, in such a manner that it can be controlled both in positive and negative directions to the maximum extent possible, that is that transistor 63 operates under class A condition. If the adjustment of the temperature limits should be changed, for example not as shown in FIGURE 5 from −20° C. to plus 80° C., but rather, for example from 0° C. to 100° C., then the parallel resistance 65 must be reset. This, however, changes the entire resistance value of the parallel circuit of resistances 64 and 65, so that resistance 60 must again be changed in order to change the working point of transistor 63.

Figure 6:
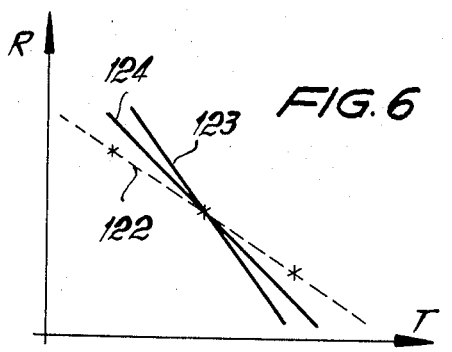

The average, or interpolation line 122 (FIGURES 5, 6) has a certain slope that is the temperature compensation of the resistance combination is already quite considerable. The amplification of the transistor 63 increases the slope, as seen in FIGURE 6, in particular line 123. In order to obtain the particular slope desired, which is necessary for temperature compensation of transistor 51 and its circuit elements 52 to 58, an adjustable inverse feedback is provided for transistor 63. This inverse feed-back then adjusts the slope of the compensation curve. A very simple solution is a current feed-back by means of the series resistance 59. Thus, by suitably adjusting resistance 59, the desired characteristic combination, for example lines 124, FIGURE 6, is obtained.

Instead of using n-p-n transistors, it is of course possible to use p-n-p transistors, and reverse the polarity of the diodes and the battery supply. Combination of mechanical pneumatic or hydraulic regulator with the electronic regulator of the present invention is, of course, possible. The building block approach can be used, for example, by choosing for one limiting function the electronic unit 42 or 43, and utilizing a mechanical overspeed, or underspeed sensing device. Further, a mechanical overspeed safety arrangement as well known in the art, can be used parallel, or in combination with, the present electronic regulator, without introducing substantial additional costs. Any single non-linear circuit may combine more than one non-linear function. It is, of course, also possible to utilize a large number than the three non-linear circuits shown, for example, to provide for a gradual increase in power as the speed increases, as shown for example in dashed lines 112 in FIGURE 3.

The injection pump, and the tachometer generator can be driven directly from the engine, or from another element which is coupled to the engine, and thus will have a speed proportional to engine speed $n_{Mot}$, for example, the cam shaft.

The tachometer generator and the electronic regulator can be built in one structural unit with the injection pump 11. This provides for a compact unit providing for continuous effective operation. The electromagnetic fuel control 12, 13 can be replaced by the electrical control for a hydraulic amplifier, which needs only small control currents. Hydraulic working pressure can be obtained readily from the injection pump. Thus, substantial parts of the circuits can be formed as integrated circuits. Integrated circuits use but little current and, if desired, a branch from the tachometer generator can then be used as a source of operating potential for the controller, thus making any further connection to the battery of the vehicle or any other power supplies unnecessary.

Figure 1A:
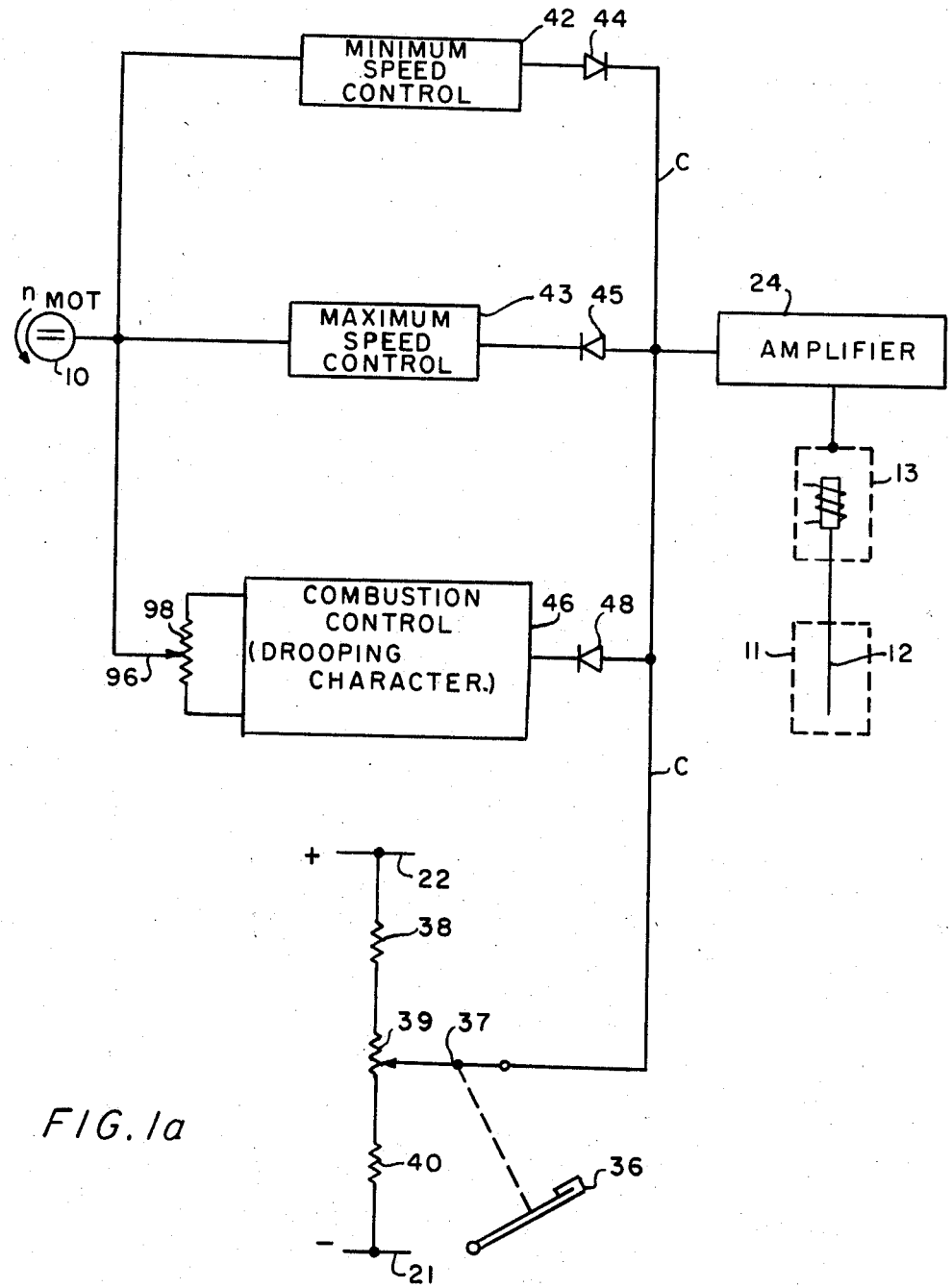
FIGURE 1a is a block diagram of an electronic regulator.

FIGURE 1a, to which reference will now be made, is a highly schematic diagram of the circuits of the present invention, and illustrating their interaction. Tachometer generator 10 is connected to the diesel engine and turns with the same speed, or with a speed proportional thereto indicated as $n_{Mot}$. A signal proportional to this speed is applied to three non-linear circuits 42, 43, 46, each of which are connected over diodes 44, 45, 48, poled as shown, to a common control bus C. The signal from common control bus C is applied over an amplifier 24 to a magnet 13, which determines the position of a valve rod 12 of injection valve 11 which injects the fuel to the engine (not shown). A manual fuel control, such as a pedal 36 used with a vehicle is mechanically linked to a potentiometer tap 37 of a voltage-divider formed of resistances 38, 39, 40 and connected across a source of constant potential, illustrated merely as buses 21, 22.

The non-linear circuits 42, 43, 46 have internal resistances which are small in comparison to the resistance of the voltage-divider 38, 39, 40. The signal-transfer characteristic of each of the non-linear circuits 42, 43, 46 is so chosen that, when the speed of the engine drops below a certain minium value, for example due to too low a setting of pedal 36, diode 44 will be rendered conductive, thus maintaining a certain minimum potential, causing a pre-determined minimum amount of fuel to be injected. Conversely, if the maximum speed is reached, diode 45 will become conductive and regardless of the setting of 36, and with it tap 37, the potential on control bus C will be regulated to decrease the setting of control rod 12. The third non-linear circuit, the combustion control 46, is also speed-dependent; it does not respond, however, to maximum speed, but rather to an intermediate speed, and, if an excessive opening of controller 12 is commanded by the position of pedal 36, the non-linear transfer characteristic of circuit 46 will become effective, diode 48 will become conductive and the control of pedal 36 will be overridden.

Broadly, the combination of the three non-linear circuits, fed by the tachometer generator 10 can be deemed to be a source of potential the resistance of which is low in comparison with the resistance of the voltage-divider 38, 39, 40 and which can provide a potential which becomes effective, or varies, in accordance with engine speed; this virtual second source of potential itself is formed by non-linear circuits, preferably (but not necessarily) three, each of which is connected to a main control bus C depending upon the operating conditions of the engine—that is if the speed is too low, too high, or if the position of the fuel valve 12 is excessive with respect to the speed so that the engine might smoke. Since the non-linear circuits are built up of readily adjustable electrical elements, the action of the controller, and the matching of the controller to any particular diesel engine or type can readily be effected.

I claim:
1. In a controller for diesel engines to control the amount of fuel injected, having means controlling the amount of fuel injected (11, 12, 13) and a manually-adjustable fuel controller (36) to control operation of the engine, the improvement comprising:

means generating a variable control potential (37, 38, 39, 40) and coupled to said fuel controller (36) to generate a potential varying in accordance with the position of said controller (36);

means interconnecting (C–24) said variable control potential means and said fuel control means (11, 12, 13);

a pair of oppositely poled diodes (44, 45) inserted with said interconnecting means (C–24);

means generating a speed signal potential (10) proportional to the speed of said engine ($n_{Mot}$);

a first non-linear circuit (42) connected to said speed-signal generating means (10) and to one of said diodes (44), said first non-linear circuit being responsive to a minimum permissible engine speed;

a second non-linear circuit (43) connected to said speed-signal generating means (10) and to the other said diode (45), said second circuit being responsive to maximum permissible engine speed;

at least one of said non-linear circuits (42, 43) including a switching diode and a resistance in series circuit therewith (53–54; 68–69), one side of said series circuit being coupled to said speed-signal generating means (10);

and coupling means (51–53; 66–67) interconnecting the other side of said series circuit and said control potential generating means (37–40).

2. Controller as claimed in claim 1, wherein said coupling means includes a transistor (51, 66) having its control electrode (base) connected to said series circuit; and an inverse feed-back circuit (52, 67) interconnecting the input and output of said transistor (51, 66).

3. Controller as claimed in claim 1, wherein said variable control potential generating means includes a high-resistance voltage-divider (38, 39, 40) having a variable tapped resistance (37–39) including a slider (37); the slider (37) of said variable tap resistance being interconnected with said fuel controller (36); said voltage-divider being adapted to be connected to a source of constant potential (20).

4. In a controller for diesel engines to control the amount of fuel injected, having means controlling the amount of fuel injected (11, 12, 13) and a manually-adjustable fuel controller (36) to control operation of the engine, the improvement comprising:

a means generating a variable control potential (37, 38, 39, 40) and coupled to said fuel controller (36) to generate a potential varying in accordance with the portion of said controller (36);
means interconnecting (C-24) said variable control potential means and said fuel control means (11, 12, 13);
a pair of oppositely poled diodes (44, 45) inserted with said interconnecting means (C-24);
means generating a speed signal potential (10) proportional to the speed of said engine ($n_{Mot}$);
a first non-linear circuit (42) connected to said speed-signal generating means (10) and to one of said diodes (44), said first non-linear circuit being responsive to a minimum permissible engine speed;
a second non-linear circuit (43) connected to said speed-signal generating means (10) and to the other said diode (45), said second circuit being responsive to maximum permissible engine speed;
a third non-linear circuit (46); a third diode (48) interconnecting said third non-linear circuit (46) and said interconnecting means (C-24), said third non-linear circuit being connected to said speed-signal generating means (10);
and means biasing (94, 96) said third non-linear circuit to modify the signal applied to said interconnecting means (C-24) when the value of the signal from said speed-signal generating means (10) reaches a predetermined amount (FIGURE 3:$n_1$).

5. Controller as claimed in claim 4, wherein said third non-linear circuit includes a transistor (90) having its output connected to said third diode (48); and a series circuit formed of a break-down diode (93) and a resistance (94, 95), said series circuit interconnecting the control electrode (base) of said transistor (90) and said speed-signal generating means (10).

6. Controller as claimed in claim 4, wherein the bias means (94, 96) of said third non-linear circuit is set to provide an output from said third non-linear circuit which is less than the output of one (43) of said other non-linear circuits (42, 43) in a region of speed of said engine (FIGURE 3:107) which is less than the maximum permissible speed of the engine.

7. Controller as claimed in claim 4, wherein the bias means (94, 95) of said third non-linear circuit is set to provide an output potential from said third non-linear circuit which is less than the output of one (42) of said other non-linear circuits (42, 43) in a region of speed of said engine (FIGURE 3:$n^*_{min}$) which is less than the minimum speed of said engine.

8. Controller as claimed in claim 4, wherein said first, second and third non-linear circuits are transistor circuits (51, 66, 90) including each a diode (53, 68, 99) abruptly changing its conductivity when a pre-determined voltage is placed thereacross and connected in circuit with the base of said transistors (51, 66, 90); and a resistance circuit, each (54, 56, 57, 55, 58; 69, 70, 74, 73, 75, 76; 94, 95, 97, 96, 98, 99) in series with each of said diodes interconnecting said diodes and said speed-signal generating means (10).

9. Controller as claimed in claim 8, wherein all said non-linear circuits are similar.

10. Controller as claimed in claim 8, and a temperature-compensating circuit in series with each of said transistors, said temperature-compensation circuit including the emitter-collector path of an additional transistor, each (63, 79, 104);

a series circuit, each, formed of a temperature-stable resistance (60, 78, 103) and a temperature-variable resistance (64, 82, 105) in parallel with said emitter-collector path, the junction between said temperature-stable and said temperature-variable resistance, each, being connected to the respective base of said additional transistor.

11. Controller as claimed in claim 10, wherein said temperature-variable resistance (64, 82, 105) includes a negative temperature coefficient resistor in parallel with said additional temperature-stable resistor (65, 83, 106).

12. Controller as claimed in claim 10, wherein said additional transistors are connected to operate as class A amplifiers.

13. Controller as claimed in claim 10, including an adjustable feed-back resistance (59, 77, 100) each, in series with the emitter-collector path of said additional transistors (63, 79, 104).

14. Controller as claimed in claim 13, wherein said feed-back resistance (59, 77, 100) is connected to the emitter of said additional transistor, and the series circuit each, in parallel to the emitter-collector path of said additional transistor (60, 64; 78, 82; 103, 105) is connected to the terminal of said adjustable feed-back resistance (59, 77, 100) which is not connected to the emitter of said additional transistor itself.

References Cited

UNITED STATES PATENTS

| | | | |
|---|---|---|---|
| 2,390,084 | 12/1945 | Edwards | 60—97 |
| 2,510,296 | 6/1950 | Root | 318—464 |
| 2,960,629 | 11/1960 | Oldenburger | 317—5 |
| 2,971,596 | 2/1961 | Davis et al. | 123—102 X |
| 3,274,443 | 9/1966 | Eggenberger et al. | 317—5 |

FOREIGN PATENTS 1,173,727   7/1964   Germany.

ROBERT A. O'LEARY, *Primary Examiner.*

WILLIAM E. WAYNER, *Assistant Examiner.*

U.S. Cl. X.R.

307—120; 317—5